United States Patent [19]

Pietkiewicz, Jr.

[11] 3,768,153

[45] Oct. 30, 1973

[54] METHOD OF MAKING CROSS BLADE COOLING FANS

[75] Inventor: Charles J. Pietkiewicz, Jr., Belleville, Mich.

[73] Assignee: Hayes-Albion Corporation, Jackson, Mich.

[22] Filed: Feb. 14, 1972

[21] Appl. No.: 226,310

[52] U.S. Cl...... 29/400 B, 29/DIG. 1, 29/156.8 CF, 29/458, 29/460, 29/526
[51] Int. Cl..... B23p 17/00, B23p 15/06, B23p 3/00
[58] Field of Search..................... 29/400, 156.8 CF, 29/458, 460, DIG. 1, 526

[56] References Cited
UNITED STATES PATENTS 2,697,873  12/1954  Cooke, Jr. ......................... 29/526 X Primary Examiner—Thomas H. Eager
Attorney—Beaman & Beaman

[57] ABSTRACT

A method of making cross blade cooling fans for internal combustion engines involving the steps of applying an uncured plastisol-base adhesive between the overlapping surface portions of the cross blades, piercing the cross blades and riveting to uniformly distribute the adhesive in sandwich relationship with said surface portions and then baking the assembly to cure the adhesive.

2 Claims, No Drawings

METHOD OF MAKING CROSS BLADE COOLING FANS

BACKGROUND OF THE INVENTION

The present invention relates to improvements in the field of cooling fans for internal combustion engines and finds particular application in the automotive industry. It has been the practice in the manufacture of metal fans to cross, center punch and rivet two sheet metal stampings to form the fan assembly. In the environment in which such fans are used, problems involving fretting between the parts of the assembly, corrosion and vibration has been experienced in the past.

SUMMARY OF THE INVENTION

In an effort to mitigate the aforesaid problems, it has been found that the use of a suitable plastisol-base adhesive applied between the overlapping portions of the cross blades before piercing and riveting is highly effective.

The plastic isolator between the cross blades may be a vinyl plastisol, a phenolic impregnated adhesive plastisol or the like. A commercial product manufactured by the Excel Corporation of Elkhart, Ind. under the designation XL-8 has proven satisfactory. A similar product is available through The B. F. Goodrich Company under the designation 370-619.

DESCRIPTION OF THE PREFERRED EMBODIMENT

In practice, a plastisol is selected having a curing cycle which substantially corresponds to the curing cycle of the paint applied to the fan assembly following riveting. Several spaced dabs of the plastisol are applied to one or both of the stampings opposed surfaces of the stampings before they are superimposed on the piercing die. The pressure of the piercing operation may be relied upon to uniformly distribute the dabs of plastisol in sandwich relation with the overlapping surface portions of the fan blades.

Following assembly, the fans are preferably painted and subjected to a cure in the order of 350° F. for approximately 20 minutes. Following the curing operation, it has been found that the sheet metal stampings making up the fan assembly are substantially isolated from each other by the plastisol-base adhesive material.

When comparative tests were run between fans which were substantially identical in all respects except for the use of the plastisol isolator between the stampings, there were substantial improvements realized in regard to fretting and corrosion with an attendant damping of vibration by lowering the amplitude of the blade movement and increasing its frequency of movement.

U.S. Pat. No. 2,697,873 constitutes the closest known art to the present invention.

I claim:

1. As steps in the manufacture of cooling fans for internal combustion engines of the cross blade type, the application of an uncured plastisol-base adhesive between the overlapping surface portions of the blades prior to assembly, piercing the cross blades and riveting to uniformly distribute the adhesive in sandwich relationship with said surface portions and then baking the assembly to cure the adhesive.

2. As steps in the manufacture of cross blade cooling fans for internal combustion engines, the application of an uncured plastisol-base adhesive between the overlapping surface portions of the cross blades, piercing the cross blades and riveting to uniformly distribute the adhesive in sandwich relationship with said surface portions, painting the assembly and then baking the assembly to cure both the paint and the adhesive.

* * * * *